United States Patent
Hashimoto et al.

(10) Patent No.: US 6,738,898 B1
(45) Date of Patent: May 18, 2004

(54) INFORMATION PROCESSOR, METHOD FOR SAVING/LOADING DATA, AND INFORMATION RECORDED

(75) Inventors: Hiroyuki Hashimoto, Shiojiri (JP); Eiji Nakaya, Tatsuno-machi (JP); Hirotsuna Miura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/674,862

(22) PCT Filed: Mar. 8, 2000

(86) PCT No.: PCT/JP00/01416
§ 371 (c)(1),
(2), (4) Date: Jun. 21, 2001

(87) PCT Pub. No.: WO00/54133
PCT Pub. Date: Sep. 14, 2000

(30) Foreign Application Priority Data

Mar. 8, 1999 (JP) ............................................. 11-060468

(51) Int. Cl.$^7$ .......................... G06F 9/445; G06F 12/00
(52) U.S. Cl. ................................ 713/1; 713/2; 711/103
(58) Field of Search ................................ 711/103, 104; 713/1, 2

(56) References Cited

U.S. PATENT DOCUMENTS

| | | | | |
|---|---|---|---|---|
| 5,410,713 A | * | 4/1995 | White et al. ................. | 713/330 |
| 5,710,930 A | * | 1/1998 | Laney et al. ................. | 713/300 |
| 6,154,819 A | * | 11/2000 | Larsen et al. ................ | 711/163 |

FOREIGN PATENT DOCUMENTS

| | | | |
|---|---|---|---|
| JP | A-57-204930 | | 12/1982 |
| JP | A-59-189423 | | 10/1984 |
| JP | A-112456 | * | 5/1986 |
| JP | A-5-216639 | | 8/1993 |
| JP | A-5-257696 | | 10/1993 |
| JP | A-6-51858 | | 2/1994 |
| JP | A-6-282362 | | 10/1994 |
| JP | A-8-171482 | | 7/1996 |
| JP | A-10-39942 | | 2/1998 |
| JP | A-11-7392 | | 1/1999 |

* cited by examiner

*Primary Examiner*—Gary Portka
(74) *Attorney, Agent, or Firm*—Oliff & Berridge, PLC

(57) ABSTRACT

An information processing device, a method of saving and loading data, and an information recording medium are provided. A volatile memory means of an information processing device of this invention stores data in a volatile manner. A nonvolatile memory device stores data in a nonvolatile manner. A determination unit determines a cause of a reset which has been generated. A saving unit saves the data stored in the volatile memory device into the nonvolatile memory device when the cause of the reset is a specified cause, and operation of the information processing device is stopped by a stopping unit. A loading unit loads the data stored in the nonvolatile memory device to the volatile memory device when the cause of the reset is not a specified cause, and operation of an operating system of the information processing device is started by a starting unit. A program which implements the information processing device is recorded on an information recording medium.

17 Claims, 4 Drawing Sheets

INFORMATION PROCESSOR, METHOD FOR SAVING/LOADING DATA, AND INFORMATION RECORDED

BACKGROUND OF THE INVENTION

1. Field of Invention

This invention relates to an information processing device, a method of saving and loading data, and an information recording medium. In particular, this invention relates to an information processing device, and a method of saving and loading data, which determines the cause(s) when reset is generated, and saves and loads data between a volatile memory device and a nonvolatile memory device depending on the cause(s), and further relates to an information recording medium which has recorded a program implementing this device and method.

2. Description of Related Art

Today, information processing devices such as widely-used business computers, portable information terminals, and computer game devices are wide spread and widely used.

In this type of information processing device, a CPU (Central Processing Unit) processes various data using a volatile memory device (main memory device) such as a RAM (Random Access Memory). A program which implements the processing executed by the CPU is stored in a ROM (Read Only Memory). When a power source of the information processing device is turned on, the CPU reads and executes a stored program called a bootloader from a fixed address of the ROM.

When the data processed by the CPU needs to be held, a method is used in which, even when the power source of the information processing device main body is turned off, the power source is supplied to the RAM, and a refresh clock is given. Furthermore, there is a method in which, by using SRAM as the RAM, a supply of a refresh clock is not needed. In addition, a method is also used in which data stored in the RAM is stored in a nonvolatile memory device (second memory device) such as a flash EEPROM (Electrically Erasable Programmable ROM), a hard disk, or a floppy disk.

For example, in an OS (Operating System) such as Windows CE (Windows is a registered trademark of Microsoft Corporation) which has been currently disseminated, there is a principle in which data is stored in a RAM, and even when the power source of the information processing device main body is turned off, electricity is supplied to the RAM, and the data which is stored in RAM is maintained.

Meanwhile, there are cases such that, due to malfunction of an application program itself managed by the OS of the information processing device, the operation of the program runs away in the middle of the program, the program falls into an infinite loop, or reset is generated by an address of the main memory device which cannot be used being accessed. Furthermore, there are cases such that as the user of the information processing device voluntarily presses a reset button, an SMI (Software Management Interrupt) is generated, the program which has run away is stopped, and the operation is restarted by resetting.

When the reset is thus generated, the CPU executes the above-mentioned bootloader and initializes and clears the RAM as part of the bootloader processing.

In particular, in an OS which provides a non-preemptive multi-task environment, such as Windows 3.1, a plurality of application programs can be simultaneously operated, but if any of the programs runs away, the entire information processing device has to be reset and the OS has to be reactivated.

In addition, in some information processing devices, a shut down function is provided which is not managed by the OS. An SMI interruption is generated by pressing and operating a suspend button, for example, data, application programs, programs of the OS main body, and/or the like stored in the RAM are saved in a hard disk or the like, in this interruption processing, and then the power source of the information processing device itself is shut down. After this, when the power source button is pressed and operated, the data and program(s) stored in the hard disk or the like are loaded into the RAM, and interruption processing is completed, and the system moves to the OS management. This is known as a hibernation function.

In addition, depending on the information processing device, there are cases such that the OS informs the application program of the shut down message, and the program which has been thus informed saves data, and then the power source is turned off.

However, the following problems exist in conventional information processing devices.

First, when a reset is generated for some reason, there is a problem such that in an information processing device in which the CPU executes the bootloader, because RAM is initialized and cleared, the data which has been processed by the operation up to that point is all erased, and the operation has to be reexecuted.

In particular, in an OS such as Windows CE, which has a format in which data is maintained in the RAM as a rule, there is a problem such that the information stored up to present was all erased. Furthermore, in an OS such as Windows 3.1, which provides a non-preemptive multi-task, there is a problem such that the data processed by an application program(s) which are operating normally, in addition to data processed by the application program that has run away, is all erased.

Furthermore, there is a problem such that a transition to the SMI interruption processing is needed during the OS operation in the information processing device with a hibernation function, and there is a possibility that the system might become unstable, and particularly when the pressing operation of the suspend button is performed while the OS has access to the hard disk, there is a risk that data on the hard disk might be erased.

Additionally, there is a problem such that if there is an abnormal condition in the middle of the application in a state in which the OS sends a sequential shutdown message to the application, the following application cannot save data, and the OS cannot voluntarily turn off the power source of the information processing device.

SUMMARY OF THE INVENTION

This invention reflects the above-mentioned problems, and an object of this invention is to provide an information processing device, and a method of saving and loading data, which determines the cause(s) when reset is generated and which saves and loads the data between a volatile memory device and a nonvolatile memory device according to the cause(s), and also relates to an information recording medium which records a program which implements this device and method.

In order to accomplish the above objects, the following invention is disclosed according to the principles of this invention.

An information processing device of this invention is provided with a volatile memory device, a nonvolatile memory device, a determination unit, a saving unit, and a loading unit, and the volatile memory device stores data in a volatile manner, the nonvolatile memory device stores data in a nonvolatile manner, and the determination unit determines the cause of a reset which has been generated.

When the cause of the reset is determined by the determination unit to be a specified cause, the saving unit saves data which has been stored in the volatile memory device in the nonvolatile memory device, and when the cause of the reset is determined by the determination unit not to be a specified cause, the loading unit loads data which has been stored in the nonvolatile memory device to the nonvolatile memory device.

Here, specified causes include cases in which a user wants to stop the information processing device in a normal manner, such as a pressing operation of a suspend button or a shutdown instruction to the OS by the user, and also cases in which the reset is abnormally generated in the information processing device, such as by a pressing operation of a reset button or a reset generation by an erroneous memory access or the like.

Meanwhile, non-specified causes include cases in which the power source of the information processing device is turned on by a pressing operation of the power source button of the information processing device.

Furthermore, the determination device of the information processing device of this invention can be structured so as to perform determinations based on whether the data which is stored in the volatile memory device is valid.

Additionally, the loading device of the information processing device of this invention can be structured so as to determine whether the data stored in the nonvolatile memory device is valid, and load the data to the volatile memory device when the data is valid.

Furthermore, the information processing device of this invention can be structured so as to be provided with a stopping unit and a starting unit.

The stopping unit stops the operation of the information processing means when the data has been saved by the saving unit.

The starting unit begins the operation of the operating system of the information processing device when the data has been loaded by the loading unit.

Furthermore, the saving unit of the information processing device of this invention can be structured so as to save data in a format that can be managed by the operating system of the information processing device.

A method of saving and loading the data of this invention can be implemented by an information processing device which is provided with a volatile memory device and a nonvolatile memory device, and the following steps are provided.

A determination step is provided which determines a cause of a generated reset.

A saving step is provided which saves data which has been stored in the volatile memory device in the nonvolatile memory device when the cause of the reset is determined in the determination step to be a specified cause.

A loading step is provided which loads data which has been stored in the nonvolatile memory device to the volatile memory device when the cause of the reset is determined in the determination step to be a non-specified cause.

The determination step in the method of saving and loading data of this invention can be structured so as to determine based on whether the data stored in the volatile memory device is valid.

The loading step in the method of saving and loading data of this invention can be structured so as to determine whether the data stored in the nonvolatile memory device is valid, and to load the data to the volatile memory device when the data is valid.

The method of saving and loading data of this invention can be further structured with the following steps:

a stopping step which stops the operation of the information processing device when the data has been saved in the saving step, and a starting step which begins the operation of the operating system of the information processing device when the data has been loaded in the loading step.

The saving step in a method of saving and loading data of this invention can be structured to save data in a format that can be managed by the operating system of the information processing device.

A program which implements the method of saving and loading data and the information processing device can be stored on an information recording medium such as a compact disk, a floppy disk, a hard disk, a photomagnetoelectric disk, a digital video disk, a magnetic tape, or a semiconductor memory.

This program is a so-called bootloader, and is executed when the information processing device is reset, and can be stored in the ROM of the information processing device. This program can also be arranged in a server computer of the WWW (World Wide Web), and the operator can appropriately download the program and store the program in the information processing device, and the program can be updated.

DETAILED DESCRIPTION OF PREFERRED EMBODIMENTS

The following explains an embodiment of this invention. Furthermore, the embodiment which will be described below is designed for this explanation, and this does not limit the scope of this invention. Therefore, those skilled in the art can use embodiments in which various elements or all the elements can be replaced with equivalent elements, and these embodiments are also included in the scope of this invention. In particular, this invention can be applied to various information processing devices such as business computers, portable information terminals, computer game devices, automobile navigation devices, minicomputer sets, and the like.

Figure 1:
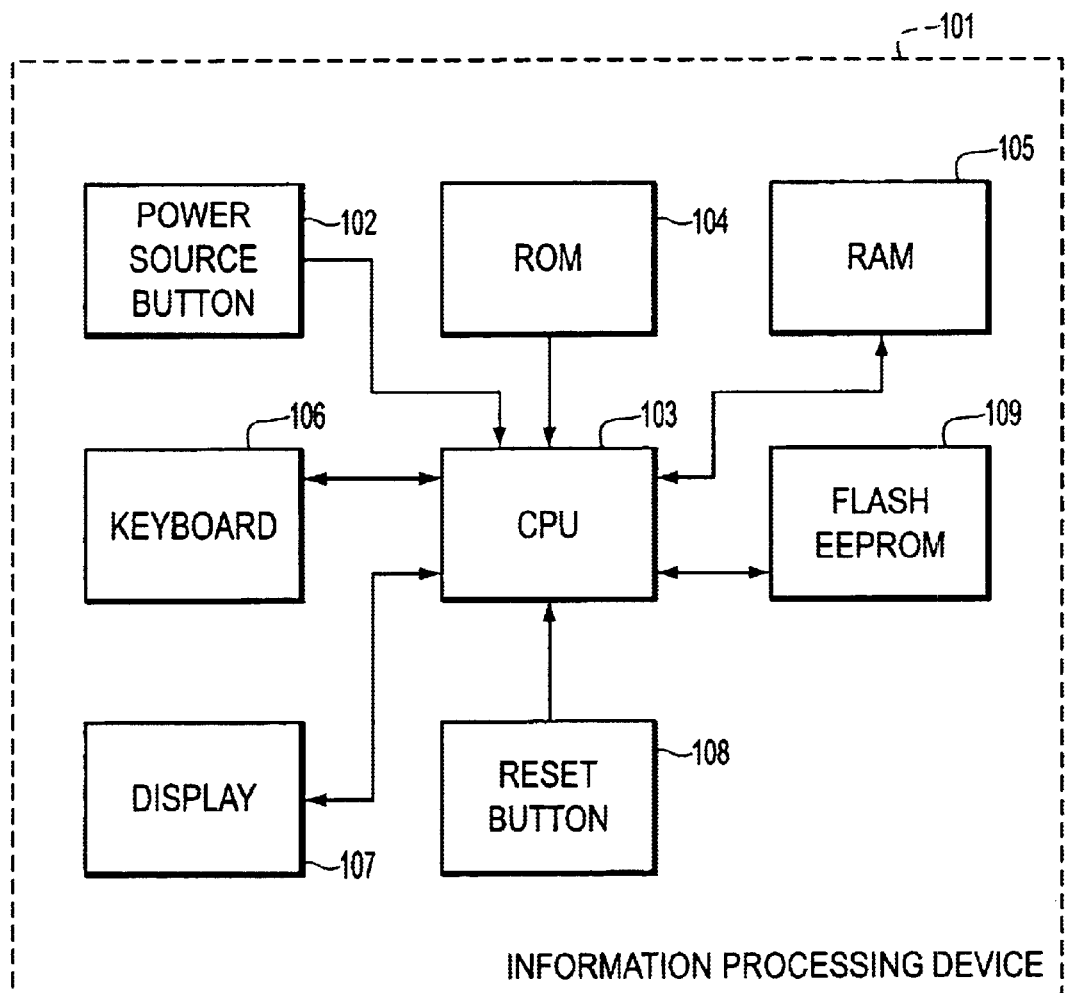
FIG. 1 is a block structural diagram of a first exemplary embodiment of an information processing device of this invention.

FIG. 1 is a block structural diagram of a first exemplary embodiment of an information processing device of this invention. It is described below with reference to FIG. 1.

In the information processing device 101, the operation is controlled by the pressing operation of a power source button 102. When the power source of the information processing device 101 is turned off, if the power source button 102 is pressed and operated, a reset is generated for the information processing device 101, and a CPU 103 executes a bootloader stored in ROM 104.

Thus, when the power source is turned on, even if the power source button 102 is pressed and operated, the power source is not immediately turned off, but an indication of the operation is transmitted to the CPU 103 in the form of a reset generation.

After the bootloader executes a boot processing, which will be explained below, the OS, such as Windows CE or the like, is activated, and an application program data processed by this application program is managed by this OS. The data processed by the application program can be stored in RAM 105, which is a volatile main memory device.

The user inputs an instruction for processing from an input device such as a keyboard 106, and the CPU 103 displays the processing result on a display device such as a display 107.

When the power source of the information processing device 101 is turned on, if the power source button 102 or the reset button 108 is pressed and operated, or if "completion of OS" is instructed to the OS, a reset is generated for the information processing device 101, and in this case as well, the CPU 103 executes a bootloader stored in the ROM 104.

Additionally, when an application program which processes data stored in the RAM 105 is running on this information processing device 101, if a reset is generated because the application program runs away or because an erroneous address is accessed, the CPU 103 executes the bootloader stored in the ROM 104.

The bootloader saves data stored in the RAM 105 in a flash EEPROM 109 when it appears that the OS and/or the application program has been operated before the reset is generated, for example, when the data stored in RAM 105 is valid as data managed by the OS.

Meanwhile, when the OS or the application program does not appear to have been operated, for example, when an "unspecified value" is stored in RAM 105, or when the power source button 102 is pressed and operated in a state in which the power source is turned off, if valid data is stored in the flash EEPROM 109 which can be loaded to the RAM 105, the OS is activated after this is loaded to the RAM 105.

Here, the RAM 105 functions as a volatile memory device the flash EEPROM 109 functions as a nonvolatile memory device, and the CPU 103 functions as a determination unit, a saving unit, a loading unit, a stopping unit, and a starting unit. The ROM 104 functions as an information recording medium which stores the program of this invention.

Furthermore, the flash EEPROM 109 is used as a nonvolatile memory device in this embodiment. However, a nonvolatile memory device other than this, for example, a hard disk, a floppy disk, a photomagnetoelectric disk, a digital video disk, a magnetic tape, a nonvolatile semiconductor memory, or the like can be used, and these embodiments are included within the scope of this invention.

(Boot Processing)

Figure 2:
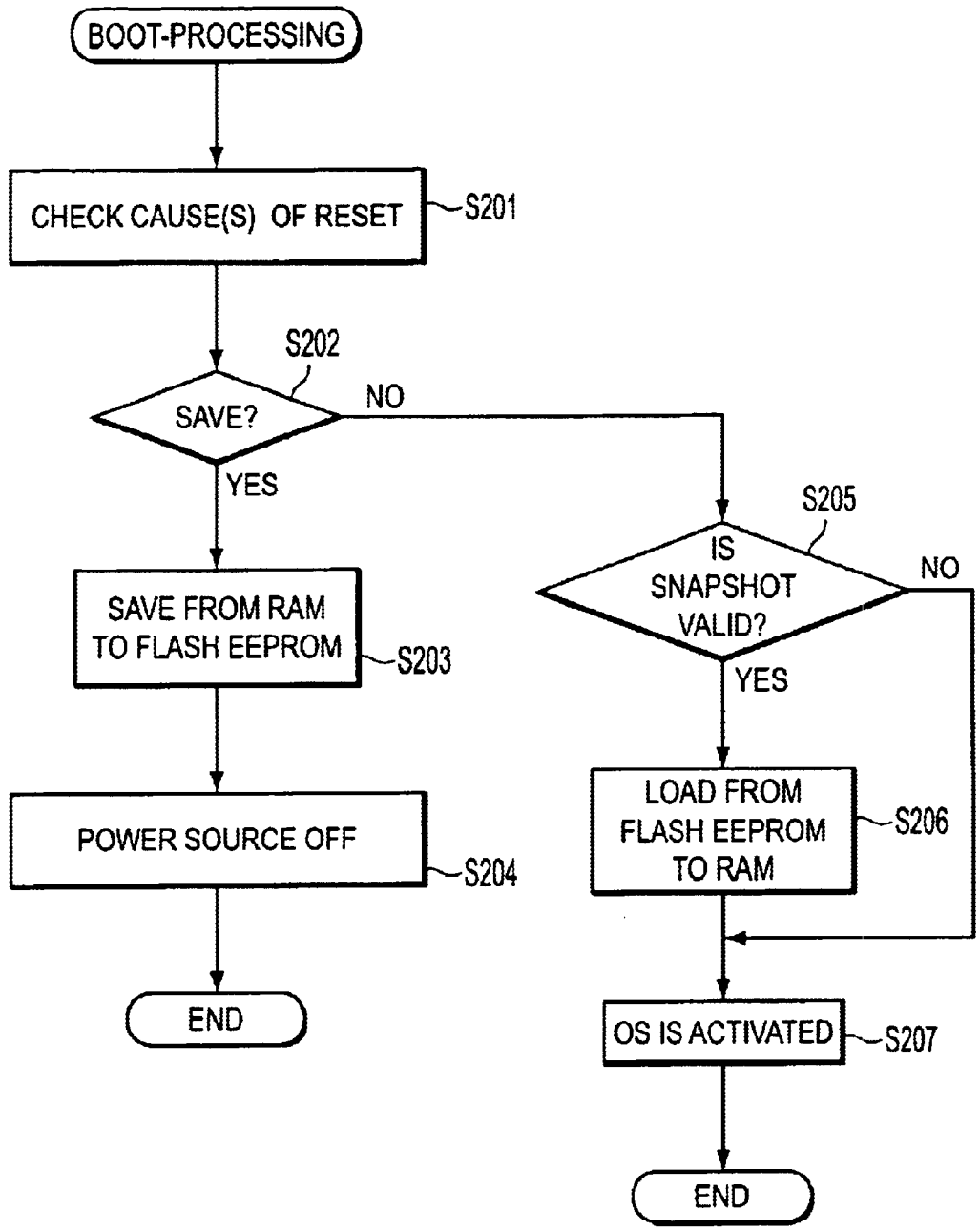
FIG. 2 is a flowchart outlining in detail the boot processing which is executed when a reset is generated in the information processing device shown in FIG. 1.

FIG. 2 is a flowchart outlining in detail the boot processing which is executed when a reset is generated in the information processing device shown in FIG. 1.

First, the CPU 103 checks the cause(s) of the reset generation (step S201) and checks whether the data stored in the RAM 103 should be saved in the flash EEPROM 109 (step S202).

Possible cause(s) of the reset generation are given above. The following examples are listed of cases in which saving should be performed in response to the cause(s):

A case in which, when the power source of the information processing device 101 is turned on, the user presses and operates the power source button 102 or the reset button 108. For example, the case in which operation is interrupted, or the case in which part of the application program runs away, or the like.

A case in which, when the power source of the information processing device 101 is turned on, the user instructs the OS to shut down via the keyboard 106. For example, the case in which the operation is completed or the like.

Meanwhile, the following cases are listed in which saving should not be performed:

A case in which, when the power source of the information processing device 101 is turned off, the user presses and operates the power source button 102, and the power source is turned on.

A case in which the data stored in the RAM 105 is different from a data format managed by the OS. For example, the case in which the program runs away, the content of the RAM 105 is destroyed, and recovery is no longer available. Furthermore, when the power source is turned on, the same status can be seen because the data stored in the RAM 105 is "undefined".

Therefore, the following should be checked in order to determine whether saving should be performed:

Check whether the data stored in the RAM 105 is in a data format managed by the OS.

Check whether the value of the register which manages the input/output instruction for the display 107 is a specified value (a value at which input/output is performed).

Furthermore, in a conventional information processing device, when a reset is generated, the content of RAM 105 is initialized and cleared, but in the information processing device of this invention, even when a reset is generated, the power source is supplied to the RAM 105 as usual, and a clock signal is given to refresh. Thus, when the OS and/or the application is ordinarily operated before the reset, boot processing can be executed while validly holding the content of the RAM 105.

When saving is to be performed, (step S202; Yes), the content of the RAM 105 is saved in the flash EEPROM 109 (step S203), the power source of the information processing device 101 is turned off (step S204), and this processing is completed. Here, if the content of the RAM 105 is in a file format which the OS which operates in the information processing device 101 can manage, a continuation of the operation of this information processing device 101 can be executed in another information processing device by copying the file to the other information processing device, turning the power source on. This type of file is called a "snapshot."

Meanwhile, when saving is not to be performed, (step S202; No), it is checked whether the file saved in the flash EEPROM 109 is valid as a snapshot (step S205). If it is valid (step S205; Yes), the snapshot is loaded from the flash EEPROM 109 to the RAM 105 (step S206), the OS is activated (step S207), and this processing is completed.

By so doing, the OS can return to the previous operation condition. Furthermore, even if part of the application program runs away, data processed by the application program that has run away in addition to data processed by another application program(s), can be recovered.

Meanwhile, if the file is not valid as a snapshot (step S205; No), the program proceeds to step S207, the OS is activated, and this processing is completed.

Figure 3:
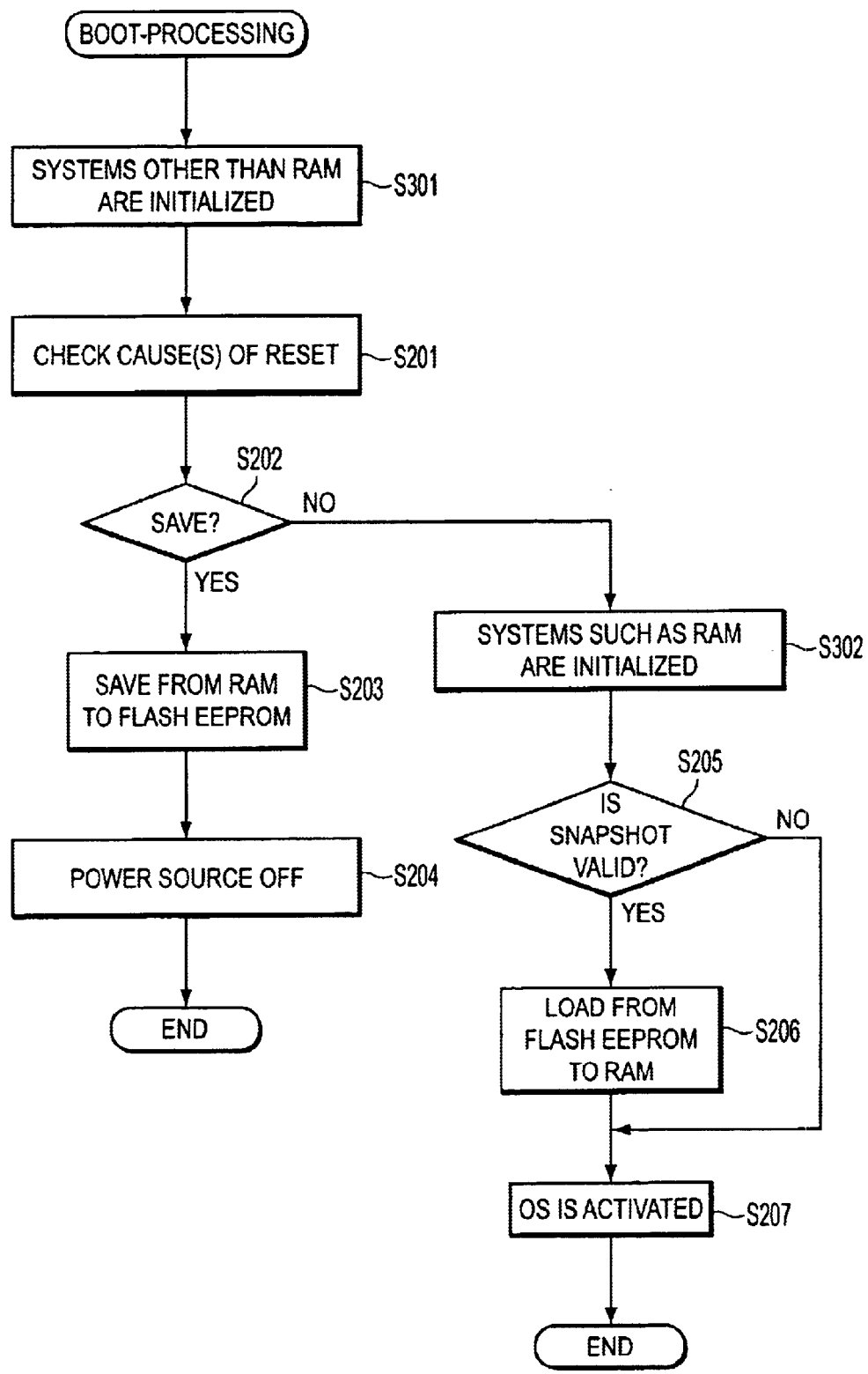
FIG. 3 is a flowchart outlining in detail the boot processing of a second exemplary embodiment of this invention.

In order to make the boot processing of the above-mentioned embodiment more secure, in this embodiment, the following new processing is added to the boot processing shown in FIG. 2. FIG. 3 is a flowchart outlining in detail the boot processing in a second exemplary embodiment. Furthermore, steps which perform the same processing use the same symbols in FIGS. 2 and 3.

In this embodiment, when a reset is generated, hardware other than the RAM 105, for example, the input/output mechanism such as a keyboard 106, the display 107, the flash EEPROM 109 and system(s) of the CPU 103 such as an interruption setting flag are initialized (step S301), and the program proceeds to step S201.

As described earlier, during the initialization in step S301 as well, the power source and a refresh signal are supplied to the RAM 105. If there is data stored in the RAM 105 before the reset, this is maintained.

By the processing of step S301, even if the status of each hardware is abnormal due to malfunction of the application program, for example, this can be corrected to a normal status by this boot processing. Meanwhile, if necessary data is stored in the RAM 105 before the reset, an opportunity to save the data is obtained.

Thereafter, the content of the RAM 105 is checked and the cause of the reset generation is checked (step S201). If the data in the RAM 105 to be saved (step S202; Yes), the data is set in the flash EEPROM 109(step S203), and the power source is turned off(step S204).

If saving is not to be performed (step S202; No), the RAM 105 is initialized and cleared, and other systems such as hardware are initialized, if needed, (step S302) and a snapshot of the flash EEPROM 109 is checked to see whether it is valid. If it is valid(step S205; Yes), the snapshot is loaded from the flash EEPROM 109 to the RAM 105(step S206), and the OS is activated (step S207). If it is not valid (step S205; No), the OS is activated (step S207), and this processing is completed.

In a conventional hibernation function, there are cases such that the system becomes unstable, but, in this embodiment, the content in RAM 105 can be saved, the power source can be turned off, the content which has been saved can be loaded, and the operation status in the information processing device 101 can be recovered.

The program(s) to execute these boot processings is stored in the ROM 104. This can be a program(s) independent from the OS. Because of this, the OS does not need to execute processing for data recovery, and the reliability of the OS itself cannot be damaged. Meanwhile, even if the bootloader is made to be a program independent from the OS, it is easy to make a file format of the snapshot into a format which can be managed by the OS, and the above-mentioned effects can be obtained in this case.

Figure 4:
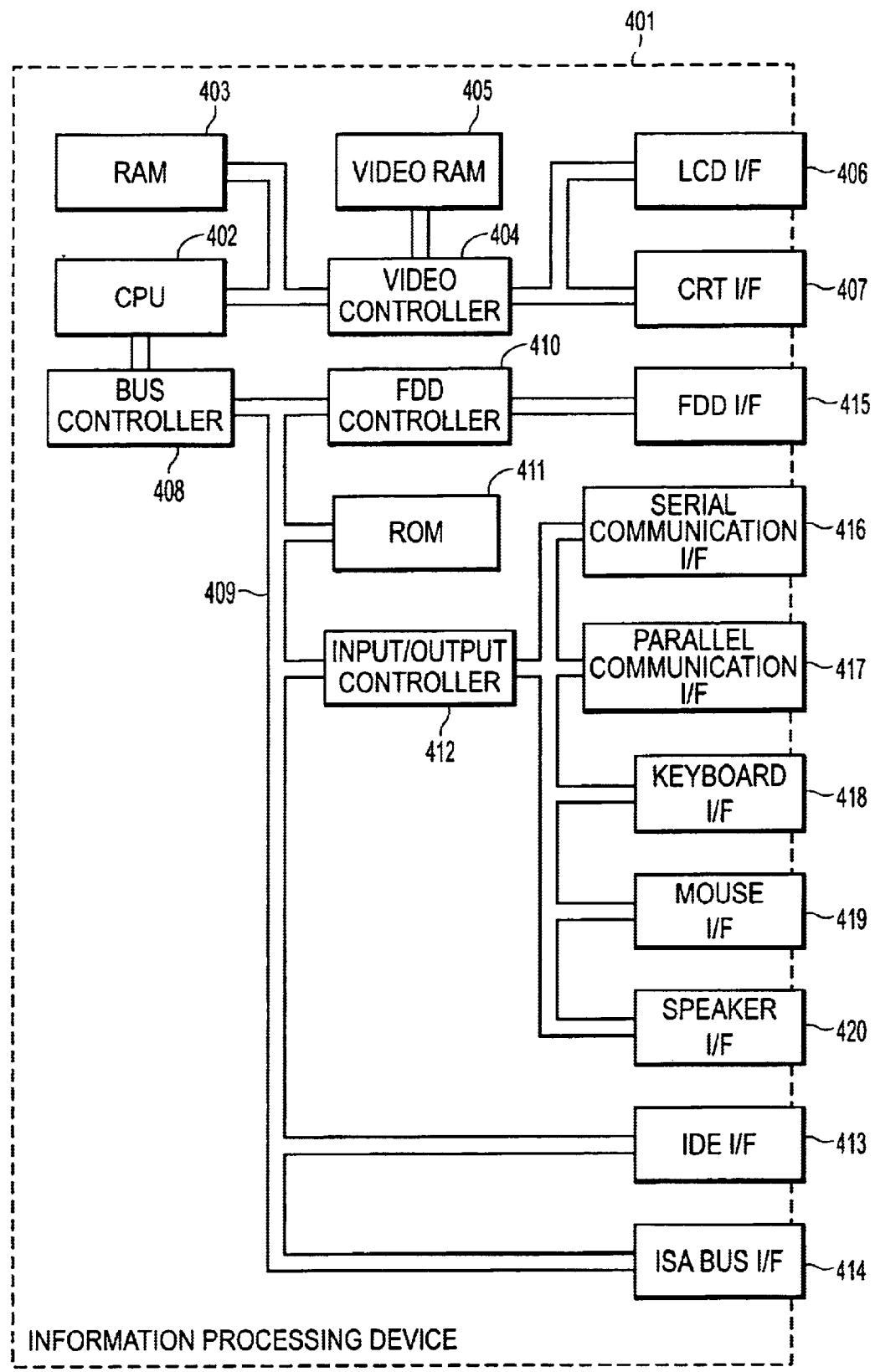
FIG. 4 is a block structural diagram of a third exemplary embodiment of an information processing device of this invention.

This invention can also be applied to the information processing device shown in FIG. 4, in addition to the information processing device 101 of the above-mentioned embodiment. FIG. 4 is a block structural diagram showing an outline of a third exemplary embodiment of an information processing device of this invention.

An information processing device 401 of this embodiment is controlled by a CPU 402, and uses a RAM 403 as a main memory device.

The CPU 402 controls a video controller 404 and a video RAM 405 and outputs a display signal to an LCD (Liquid Crystal Display) interface (I/F) 406 and a CRT (Cathode Ray Tube) interface 407.

The CPU 402 controls a bus 409 in cooperation with a bus controller 408. An FDD (Floppy Disk Drive) controller 410, a BIOS (Basic Input Output System) ROM 411 in which a bootloader is stored, an input/output controller 412, and an IDE (Integrated Device Electronics) interface 413, to which a hard disk, a flash memory card and/or the like are externally connected, are connected to the bus 409. Furthermore, this bus 409 is based on the ISA (Industry Standard Architecture) bus specification, which is widely disseminated, and expansion of the system becomes easy with the ISA bus interface 414. The FDD controller 410 is connected to an external FDD via the FDD interface 415.

The input/output controller 412 controls input/output devices which are externally connected via a serial communication interface 416, a parallel communication interface 417, a keyboard interface 418, a mouse interface 419, and a speaker interface 420.

Thus, even in a minicomputer in which the CPU and a peripheral device controller are integrated, this invention can be applied by recording the bootloader in ROM 411. That is, as reset is generated, data can be saved and loaded between the RAM 403 and an external hard disk, flash memory card or the like connected via the IDE interface 413.

As explained above, according to this invention, the following effects can be obtained.

First, an information processing device and a method of saving and loading the data can be provided in which, when a reset is generated, the cause is determined, and depending on the cause, data is saved and loaded between a volatile memory device and a nonvolatile memory device.

In particular, an information processing device and a method of saving and loading the data can be provided in which, in the case of an unexpected condition such as a runaway of an application program, data which has been processed can be securely saved, and the operation status can be recovered.

Furthermore, an information processing device and a method of saving and loading the data can be provided in which saved data is transferred to another information processing device and a continuation of the operation can be implemented in the other information processing device.

Furthermore, an information recording medium which has recorded a program can be easily distributed and sold as a software product, independent from the hardware of the information processing device. If the program stored on the information recording medium of this invention is executed in an information processing device such as a general purpose computer, the information processing device and the method of saving and loading data related to the above-mentioned invention can be implemented.

What is claimed is:

1. An information processing device, comprising:

a volatile memory device which stores data in a volatile manner, a nonvolatile memory device which stores data in a nonvolatile manner, a determination unit which determines whether a cause of a reset which has been generated is one of a plurality of specified causes or a non-specified cause, a saving unit which saves data stored in the volatile memory device in the nonvolatile memory device when the cause of the reset is determined by the determination unit to be any of said specified causes, and a loading unit which loads data stored in the nonvolatile memory device to the volatile memory device when the cause of the reset is determined by the determination unit to be a non-specified cause.

2. The information processing device as set forth in claim 1, the determination unit determining the cause based on whether the data stored in the volatile memory device is valid data.

3. The information processing device as set forth in claim 1, the loading unit further determining whether the data stored in the nonvolatile memory device is valid, and loading the data to the volatile memory device when the data is valid.

4. The information processing device as set forth in claim 1, further comprising:

a stopping unit which stops operation of the information processing means when the data has been saved by the saving unit, and a starting unit which begins operation of an operating system of the information processing device when the data has been loaded by the loading unit.

5. The information processing device as set forth in claim 4, the saving unit saving data in a format that can be managed by the operating system of the information processing device.

6. A method of saving and loading data in an information processing device provided with a volatile memory device and a nonvolatile memory device, comprising:

determining whether a cause of a reset which has been generated is one of a plurality of specified causes or a non-specified cause, saving data stored in the volatile memory device in the nonvolatile memory device when the cause of the reset is determined to be any of said specified causes, loading the data stored in the nonvolatile memory device to the volatile memory device when the cause of the reset is determined to be a non-specified cause.

7. The method of saving and loading data as set forth in claim 6, determining the cause being based on whether the data stored in the volatile memory device is valid data.

8. The method of saving and loading data as set forth in claim 6, further comprising:

determining whether the data stored in the nonvolatile memory device is valid, and loading the data into the volatile memory device when the data is valid.

9. The method of saving and loading data as set forth in claim 6, further comprising:

stopping operation of the information processing device when the data has been saved, and starting operation of an operating system of the information processing device when the data has been loaded.

10. The method of saving and loading data as set forth in claim 9, further comprising:

saving the data in a format that can be managed by the operating system of the information processing device.

11. An information recording medium on which is recorded a program which controls an information processing device provided with a volatile memory device and a nonvolatile memory device, the program comprising instructions to perform:

a determination step which determines whether a cause of a reset which has been generated is one of a plurality of specified causes or a non-specified cause, a saving step which saves the data stored in the volatile memory device in the nonvolatile memory device when the cause of the reset is determined in the determination step to be any of said specified causes, and a loading step which loads the data stored in the nonvolatile memory device in the volatile memory device when the cause of the reset is determined in the determination step to be a non-specified cause.

12. The information recording medium on which is recorded the program as set forth in claim 11, the determination step determining the cause based on whether the data stored in the volatile memory device is valid data.

13. The information recording medium on which is recorded the program as set forth in claim 11, the loading step further determining whether the data stored in the nonvolatile memory device is valid, and loading the data to the volatile memory device when the data is valid.

14. The information recording medium on which is recorded the program as set forth in claim 11, the program further comprising instructions to perform:

a stopping step which stops operation of the information processing device when the data has been saved in the saving step, and a starting step which begins operation of an operating system of the information processing device when the data has been loaded in the loading step.

15. The information recording medium on which is recorded the program as set forth in claim 14, the saving step saving the data in a format that can be managed by the operating system of the information processing device.

16. The information recording medium on which is recorded the program as set forth in claim 11, the information recording medium being one of a compact disk, a floppy disk, a hard disk, a photomagnetoelectric disk, a digital video disk, a magnetic tape, and a semiconductor memory.

17. The information processing device as set forth in claim 1, in which an operating system is installed of the type in which various setting values of operating system functions are set in a nonvolatile memory means after the operating system is activated, wherein after various setting values of the operating system functions are temporarily set in the volatile memory device with different contents for every user after the operating system is activated, a loader of the operating system writes a content which is held in the volatile memory device to the nonvolatile memory device, and is read to the volatile memory device from the nonvolatile memory device before the operating system is next activated, whereby various setting values of the operating system functions do not need to be set again.

* * * * *